United States Patent
Song et al.

(10) Patent No.: US 8,521,750 B2
(45) Date of Patent: *Aug. 27, 2013

(54) SITUATION-AWARE RECOMMENDATION USING CORRELATION

(75) Inventors: Yu Song, Pleasanton, CA (US); Sangoh Jeong, Palo Alto, CA (US); Doreen Cheng, San Jose, CA (US); Swaroop Kalasapur, Sunnyvale, CA (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/436,237

(22) Filed: Mar. 30, 2012

(65) Prior Publication Data

US 2012/0191706 A1 Jul. 26, 2012

Related U.S. Application Data

(63) Continuation of application No. 12/137,417, filed on Jun. 11, 2008, now Pat. No. 8,171,035, which is a continuation of application No. 12/099,716, filed on Apr. 8, 2008, now Pat. No. 8,019,782.

(60) Provisional application No. 61/033,315, filed on Mar. 3, 2008, provisional application No. 60/981,812, filed on Oct. 22, 2007.

(51) Int. Cl.
*G06F 17/30* (2006.01)

(52) U.S. Cl.
USPC .......................................................... 707/751

(58) Field of Classification Search
USPC .......................................... 707/737, 739, 751
See application file for complete search history.

(56) References Cited

U.S. PATENT DOCUMENTS

| | | | |
|---|---|---|---|
| 6,848,104 | B1 | 1/2005 | Van Ee et al. |
| 7,039,638 | B2 | 5/2006 | Zhang et al. |
| 7,096,219 | B1 | 8/2006 | Karch |
| 7,174,343 | B2 | 2/2007 | Campos et al. |
| 7,461,061 | B2 | 12/2008 | Aravamudan et al. |
| 7,461,073 | B2 | 12/2008 | Gao et al. |
| 7,664,718 | B2 | 2/2010 | Acharya et al. |
| 7,689,585 | B2 | 3/2010 | Zeng et al. |
| 7,792,770 | B1 | 9/2010 | Phoha et al. |
| 2003/0172063 | A1 | 9/2003 | Gutta et al. |
| 2003/0224344 | A1 | 12/2003 | Shamir et al. |
| 2004/0073918 | A1 | 4/2004 | Ferman et al. |
| 2007/0271266 | A1 | 11/2007 | Acharya et al. |
| 2007/0271287 | A1 | 11/2007 | Acharya et al. |
| 2008/0077575 | A1 | 3/2008 | Tateno et al. |
| 2008/0120287 | A1 | 5/2008 | Guan et al. |

OTHER PUBLICATIONS

Chen et al., "A Survey of Context-Aware Mobile Computing Research," Dartmouth Computer Science Technical Report TR2000-381, Dartmouth College, 2000.

(Continued)

*Primary Examiner* — Jorge A Casanova
(74) *Attorney, Agent, or Firm* — Kenneth L. Sherman, Esq.; Michael Zarrabian, Esq.; Sherman & Zarrabian LLP (57) ABSTRACT

In one embodiment, data relating to usage patterns of the user is stored, wherein the data includes information as to items which were used and the context in which they were used. A correlation table is constructed. Correlation values between each item and each context are then stored in then correlation table, wherein the correlations are used to recommend one or more of the items.

22 Claims, 7 Drawing Sheets

(56) References Cited

OTHER PUBLICATIONS

John A. Flanagan, "Unsupervised Clustering of Context Data and Learning User Requirements for a Mobile-Device", 5th Intl' and Interdisp. Conf. on Modeling and Using Context (CONTEXT-05), pp. 155-168, 2005.

J. B. MacQueen, "Some Methods for Classification and Analysis of Multivariate Observations", Proceedings of 5th Berkeley Symposium on Mathematical Statistics and Probability, Berkeley, University of California Press, pp. 281-297, 1967.

Hyuk Cho et al., "Minimum Sum-Squared Residue Co-clustering of Gene Expression Data", Proceedings of the Fourth SIAM International Conference on Data Mining (SDM), pp. 114-125, Apr. 2004.

Allen Gersho et al., "Random Processes and Linear Systems" (Chapter 2), pp. 19-47, Vector Quantization and Signal Compression, 1992, Kluwer Academic Publishers, Second Printing, 1993.

Allen Gersho et al., "Sampling" (Chapter 3), pp. 51-81, Vector Quantization and Signal Compression, 1992, Kluwer Academic Publishers, Second Printing, 1993.

Allen Gersho et al., "Linear Prediction" (Chapter 4), pp. 85-129, Vector Quantization and Signal Compression, 1992, Kluwer Academic Publishers, Second Printing, 1993.

S.C. Madeira, A. L. Oliveira, "Biclustering Algorithms for Biological Data Analysis: A Survey," IEEE Transactions on Computational Biology and Bioinformatics, vol. 1, Issue 1, pp. 24-45, 2004.

Equitz, A New Vector Quantization Clustering Algorithim, 1989, IEEE, 1568-1575.

Kollios, et al., "Efficient Biased Sampling for Approximate Clustering and Outlier Detection in Large Data Sets," Sep.-Oct. 2003, IEEE, vol. 15, 1170-1187.

Wang et al., Scalable sequential pattern mining for biological sequences, Nov. 2004, ACM, 178-187.

Ricci et al. "*Acquiring and Revising Preferences in a Critique-Based Mobile Recommender System.*" Journal IEEE Intelligent Systems, vol. 22 Issue 3, May 2007.

J.L. Herlocker et al., "An Algorithm Framework for Performing Collaborative Filtering", In. Proc. of the 1999 Conference on Research and Development in Information Retrieval, 1999, 8 pages.

M. Deshpande et al., "Item-Based Top-N Recommendation Algorithms", ACM Transactions on Information Systems, vol. 22, No. 1, Jan. 2004, pp. 143-177.

Office Action in U.S. Appl. No. 12/104,086, mailed Jul. 16, 2010.

Office Action in U.S. Appl. No. 12/104,086, mailed Nov. 8, 2010.

Office Action in U.S. Appl. No. 12/099,716, mailed Sep. 30, 2010.

Final Office Action dated Feb. 3, 2011 from U.S. Appl. No. 12/099,716.

Notice of Allowance dated May 13, 2011 from U.S. Appl. No. 12/099,716.

Notice of Allowance dated Sep. 23, 2011 from U.S. Appl. No. 12/104,086.

Office Action in U.S. Appl. No. 12/137,417 dated on Aug. 2, 2010.

Notice of Allowance dated Nov. 10, 2010 from U.S. Appl. No. 12/137,417.

Notice of Allowance dated Nov. 21, 2011 from U.S. Appl. No. 12/137,417.

Notice of Allowance dated Feb. 27, 2012, from U.S. Appl. No. 12/137,417.

Notice of Allowance dated Feb. 27, 2012 from U.S. Appl. No. 12/104,086.

Lei et al., "Applying Situation Awareness to Mobile Proactive Information Delivery," Lecture Notes in Computer Science, 2007, vol. 4809/2007, pp. 592-603.

100   102   104   106   108   110

| Time | Loc. | Temp | Email | Web | Note |

|         | Morning | Afternoon | Night | Home | Office | Email | Word | Chess |
|---------|---------|-----------|-------|------|--------|-------|------|-------|
| Morning | -       | -         | -     | -    | -      | 0.90  | 0.83 | 0.10  |
| Afternoon | -     | -         | -     | -    | -      | 0.90  | 0.95 | 0.20  |
| Night   | -       | -         | -     | -    | -      | 0.15  | 0.05 | 0.80  |
| Home    | -       | -         | -     | -    | -      | 0.50  | 0.50 | 0.98  |
| Office  | -       | -         | -     | -    | -      | 0.99  | 0.95 | 0.20  |
| Email   | 0.90    | 0.90      | 0.15  | 0.5  | 0.99   | -     | -    | -     |
| Word    | 0.83    | 0.95      | 0.05  | 0.5  | 0.95   | -     | -    | -     |
| Chess   | 0.10    | 0.20      | 0.80  | 0.98 | 0.20   | -     | -    | -     |

SITUATION-AWARE RECOMMENDATION USING CORRELATION

CROSS-RELATION TO RELATED APPLICATIONS

This application is a continuation of co-pending U.S. patent application Ser. No. 12/137,417, filed on Jun. 11, 2008, which is a continuation-in-part of U.S. patent application Ser. No. 12/099,716, entitled "SITUATION AWARE RECOMMENDATION USING LIMITED CLUSTER SIZES," by Yu Song, Sangoh Jeong, Doreen Cheng, and Swaroop Kalasapur, filed Apr. 8, 2008, which is claims priority to provisional patent application Ser. No. 61/033,315, entitled "SITUATION-AWARE TASK RECOMMENDATION FOR MOBILE DEVICES," by Doreen Cheng, Yu Song, Hyuk Cho, Sangoh Jeong, Swaroop Kalasapur, and Alan Messer, filed Mar. 3, 2008 and provisional patent application Ser. No. 60/981,812, entitled "SITUATION-AWARE RECOMMENDATION FOR COMPUTING SYSTEMS," by Yu Song, Doreen Cheng, Swaroop Kalasapur, and Dongyun Jin, filed Oct. 22, 2007, all of which are herein incorporated by reference in their entireties.

BACKGROUND OF THE INVENTION

1. Field of the Invention

The present invention relates to situation recognition. More particularly, the present invention relates to the situation-aware recommendation of items to a user using correlation.

2. Description of the Related Art

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and Multimedia Messaging Service (MMS) for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mail. Its main standardization effort is done by 3GPP, 3GPP2 and Open Mobile Alliance (OMA).

There are many circumstances in which it would be beneficial for a computer or other electronic device to be able to recommend software applications or other items for a user to download, install, and/or utilize in other ways. Once such circumstance is where the user is operating a mobile device. The display and interface limitations of such devices make it difficult for users to perform significant searching for applications using them. For example, a user may be shopping and desire to utilize a price comparison software application on his mobile device. However, it would be difficult for the user to navigate the Internet and/or a directory of available software applications using the mobile device. In such cases, it would be beneficial to recommend to the user a small set of software applications.

SUMMARY OF THE INVENTION

In one embodiment, data relating to usage patterns of the user is stored, wherein the data includes information as to items which were used and the context in which they were used. A correlation table is constructed. Correlation values between each item and each context are then stored in then correlation table, wherein the correlations are used to recommend one or more of the items.

In another embodiment, an apparatus is provided comprising: an interface; and one or more processors configured to: store data relating to usage patterns of the user, wherein the data includes information as to items which were used and the context in which they were used; construct a correlation table; and store correlation values between each item and each context in the correlation table, wherein the correlations are used to recommend one or more of the items.

In another embodiment, a system for making recommendations to a user is provided, the system comprising: means for storing data relating to usage patterns of the user, wherein the data includes information as to items which were used and the context in which they were used; means for constructing a correlation table; and means for storing correlation values between each item and each context in the correlation table, wherein the correlations are used to recommend one or more of the items.

In another embodiment, a program storage device readable by a machine tangibly embodying a program of instructions executable by the machine is provided to perform a method for making recommendations to a user, the method comprising: storing data relating to usage patterns of the user, wherein the data includes information as to items which were used and the context in which they were used; constructing a correlation table; and storing correlation values between each item and each context in the correlation table, wherein the correlations are used to recommend one or more of the items.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, software applications or other items may be automatically recommended to the user based on data related to the current context and past usage information. Context refers to the situation in which the user and/or device the user is operating. For example, the context may include the location of the user—whether the user is home, at the office, or elsewhere. The context may also include the time of day—for example, whether it is morning, afternoon, or evening. One of ordinary skill in the art will recognize that there may be many other types of information captured by the context and nothing in this document shall be read as limiting the invention to any particular type of information.

One way for a system to provide software recommendations would be to let a user specify his or her preferences, and use the preferences to guide application/service recommendations. For example, a user may indicate a preference for business-related software, and the system may use this information to err on the side of recommending business-related software applications. Thus, for example, if the choice is between a game application and a word processing application, the system would recommend a word processing application. This solution, however, suffers from the drawback that user studies have shown that few users would bother to specify preferences, as such there is simply no data from which to extract such a recommendation. Furthermore, even when preferences are specified, user preferences are usually situation-dependent, i.e., a user's preferences vary from situation to situation. For example, while a user may have a preference for business-related software while at work or during the daytime, the same user may have a preference for entertainment-related software while at home. In another example, at evening at home on a rainy day, the user may want to cook dinner and watch news, and may prefer software applications related to those tasks, while at a similar time at the office and in a meeting, the user may want to call home and arrange for food to be picked up on the way home. The preference-based approach to recommendations, used alone, simply does not provide the level of granularity needed to be effective for real-world uses.

Figure 1:
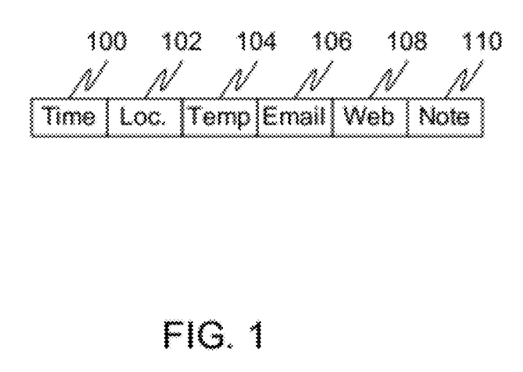
FIG. 1 is a diagram illustrating an example vector storing context and usage information for a single data point.

As such, in an embodiment of the present invention, context information is captured and utilized in the application-recommending process. Data relating to previous usage information may be collected and stored as data points. The data point information may be stored in vectors. FIG. 1 is a diagram illustrating an example vector storing context and usage information for a single data point. In this example, context information includes time 100, location 102, and temperature 104. Usage information indicates which applications the user operated, including email 106, web browsing 108, and notepad 110.

Figure 2:
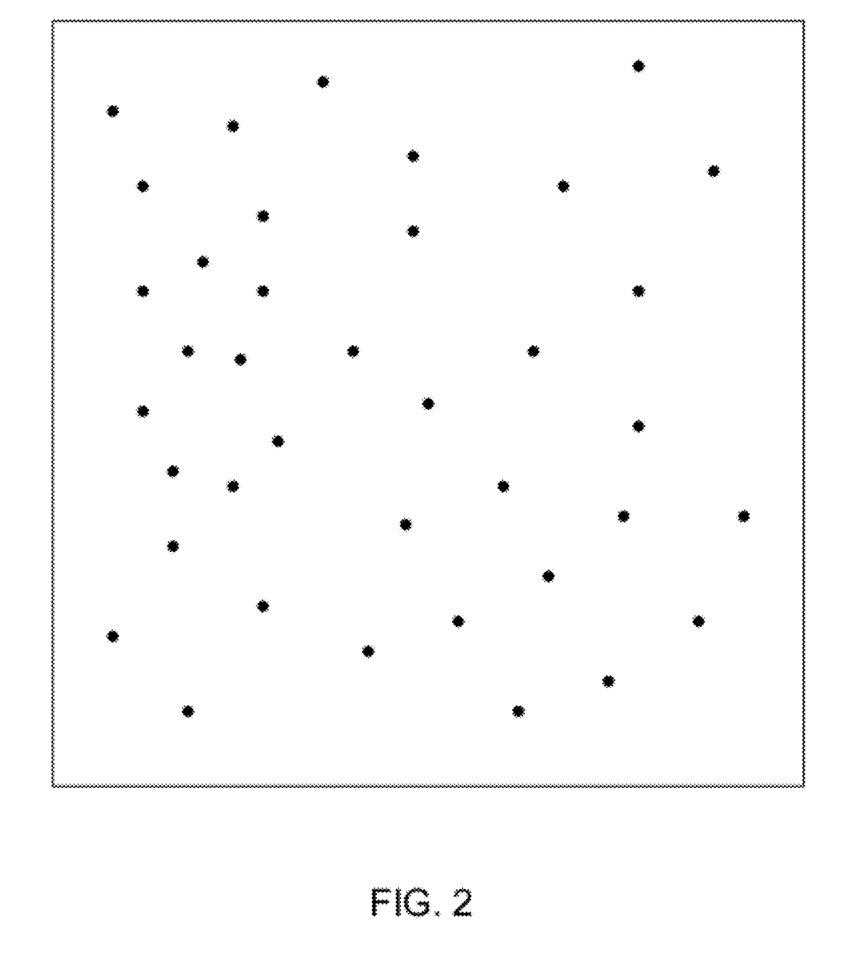
FIG. 2 is a diagram illustrating an example graph.

Each data point may also be visualized as a point on a two-dimensional graph. FIG. 2 is a diagram illustrating an example graph. The proximity of data points to one another on the graph indicates the level of similarity of their vectors. In an embodiment of the present invention, these data points may be grouped into clusters of similar data points. Clustering is the classification of objects into different groups, or more precisely, the partitioning of a data set into subsets (clusters), so that the data in each subset (ideally) share some common trait—often proximity according to some defined distance measure. These clusters may then be utilized in aiding the system select appropriate applications to recommend.

Figure 3:
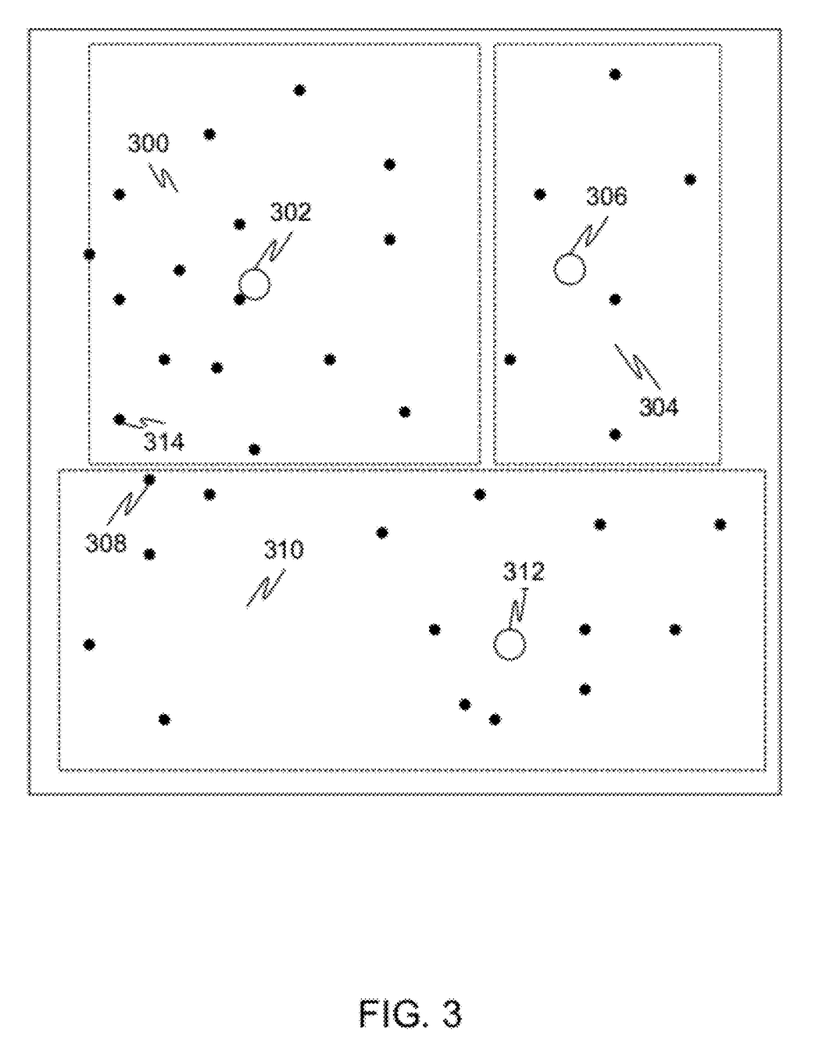
FIG. 3 is an example of the graph with the data points clustered.

One way to cluster the data points is to attempt to determine the optimum number of clusters for a given set of data points. This optimum number is known as K. There are a number of traditional techniques for making this determination, all of which are beyond the scope of this application. There are numerous drawbacks to this approach, however. K must be determined dynamically, and as such requires significant processing power, processing power that may be lacking in mobile devices. Additionally, K can be very difficult to determine with any degree of accuracy, and an incorrect guess can negatively impact both the clustering and recommendation accuracy. Given the partitioned clusters, one way to extract patterns is to compare the current data point with each of the cluster centroids and determine to which cluster the current data point belongs. The application patterns are then extracted from this cluster. For n-dimensional structures, a centroid is an intersection of all hyperplanes that divide X into two parts of equal moment about the hyperplane. Informally, it is the "average" or "mean" of all points of X. Thus, a centroid of a cluster is the mean of all points in the cluster. FIG. 3 is an example of the graph with the data points clustered. Cluster 300 has centroid 302 and Cluster 304 has centroid 306.

Comparing the centroids, however, may create a situation where certain neighboring data points may not be selected as one of the k neighboring data point, despite being close to the current data point, simply because they are part of clusters whose centroid is farther from the current data point than other centroids. One instance of such a case is depicted in FIG. 3, where data point 308 is part of cluster 310. Data point 308 is closer to cluster 300 than any of the data points in cluster 304, yet because the centroid 312 of cluster 310 is farther from the centroid 302 of cluster 300 than the centroid 306 of cluster 304, data point 308, despite being arguably the most similar to a relevant data point 314 in cluster 300, may not be used in the analysis.

In contrast to clustering, another way to extract patterns is to group neighboring data points nearest to the current data point. The nearest neighbors are those that are most similar to the current contexts and application usages. The application patterns are then extracted from these neighboring instances. This approach, however, requires that all of the existing data points be compared in order to find the neighbors, and thus is also not suitable for online computation on resource-limited devices such as mobile In an embodiment of the present invention, rather than clustering the data, a correlation between an item and a context is computed from the usage log. The correlation value reveals how a context affects the usage of an item. A final usage pattern of an item is computed by combining effects from multiple contexts.

When a new point comes in (i.e., a recommendation is to be made based on a current context), then, for each item, a value for the item is computed based on the combined, multiple effects from the correlation table and the current context values. The recommendation decision is then made based on the computed value for the item.

Figure 4:
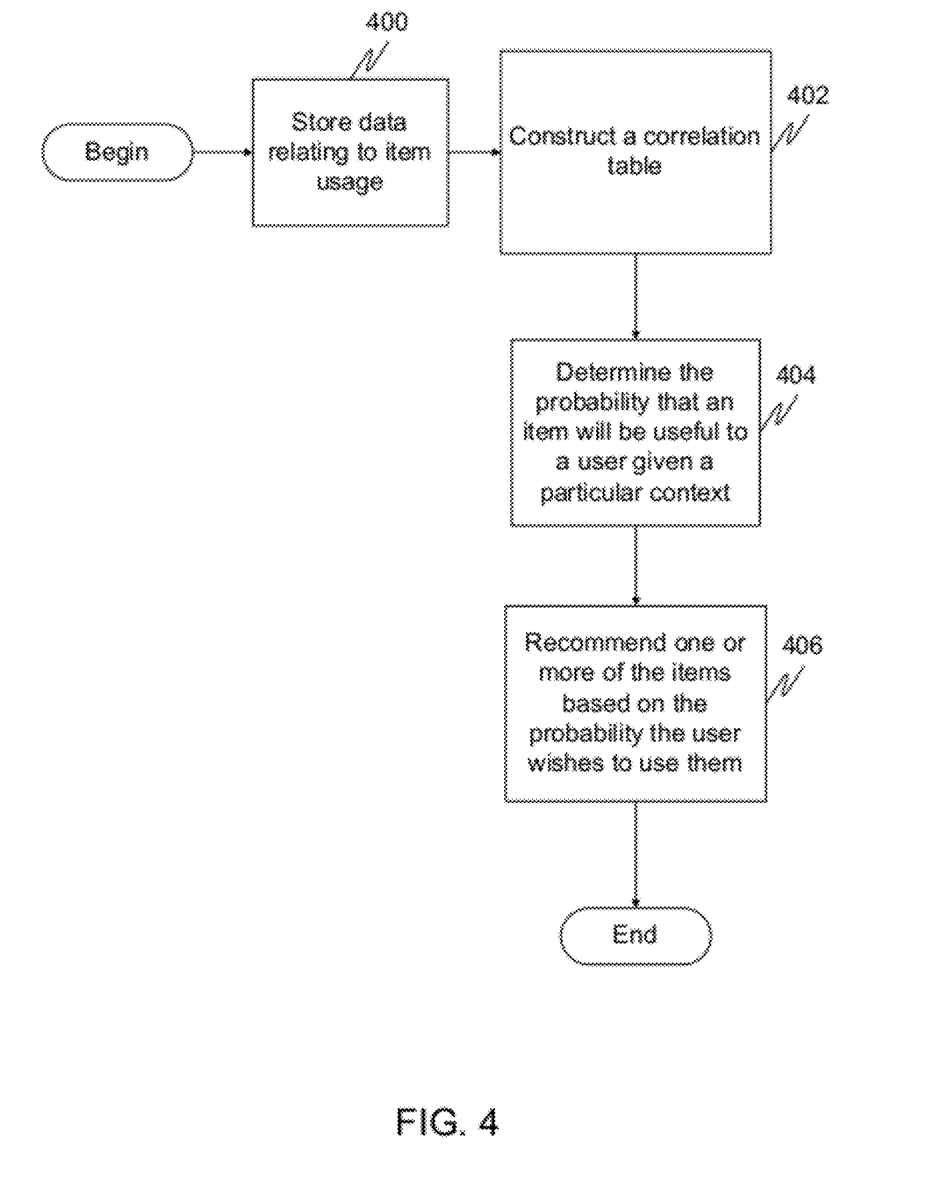
FIG. 4 is a flow diagram illustrating a method for making recommendations to a user in accordance with an embodiment of the present invention.

FIG. 4 is a flow diagram illustrating a method for making recommendations to a user in accordance with an embodiment of the present invention. Each step in this method may be embodied in hardware, software, or any combination thereof. The user may be utilizing an electronic device. This device may be a stationary device, such as a desktop computer, or may be a mobile device, such as a mobile phone, PDA, or laptop computer. One of ordinary skill in the art will recognize that other types of devices may be used with the present invention, and that nothing in this document shall be interpreted as limiting the device to any particular implementation.

At step 400, data relating to item usages of the user is stored. This data includes information as to items which were used by the user and the context in which they were used. The items may include any items that the user may find getting recommendations on as helpful. In one embodiment of the present invention, the items may include software applications running on the device. Thus, the user may find it helpful to receive recommendations on other, perhaps non-running, applications so that the user does not download, install, or run applications that have only a low probability that the user may be interested in them. In another embodiment of the present invention, the items may include computing services. This may include, for example, applications that run on other devices, such as remote games, diagnostic services, or antivirus services. In another embodiment of the present invention, the items may include other information, such as, for example, movies, web sites, music, etc. One of ordinary skill in the art will recognize that many different types of objects may be recommended using various embodiments of the present invention. This usage data may be stored in, for example, vectors. The vectors may contain contexts concatenated with application usage values.

At 402, a correlation table may be constructed. The correlation table includes correlation values for each item and each context. In one embodiment, the correlation values range from 1 to −1. 1 indicates that an item and a context have a strong positive correlation, meaning that the value of the items increases when the value of the context increases. −1 indicates that an item and a context have strong negative correlation, meaning that the value of the item decreases when the value of the context increases. 0 indicates the item and the context have no correlation or the correlation is not clear. The main advantage of using correlation is the speed and efficiency of the solution. There is no need to guess at a K number for clustering.

Figure 5:
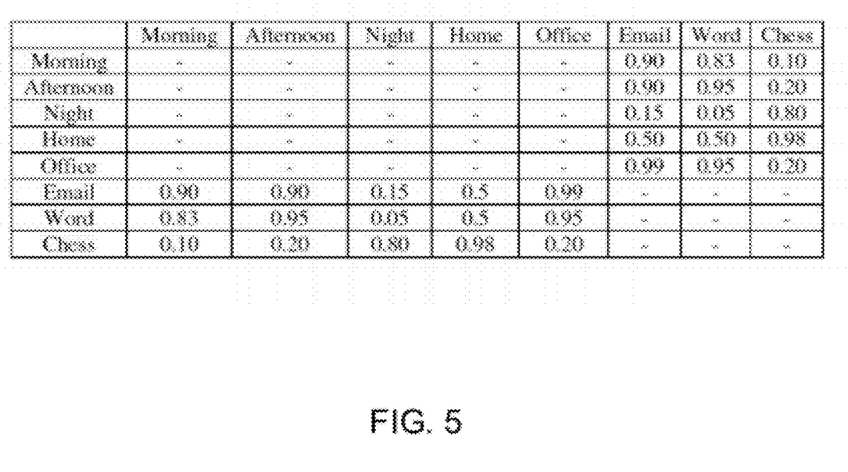
FIG. 5 is an example of a correlation table in accordance with an embodiment of the present invention.

FIG. 5 is an example of a correlation table in accordance with an embodiment of the present invention. In this example, the items represent software applications to be represented. Here, on each axis, various contexts are listed (here, three times of day, morning, afternoon, and night, are listed, as well as two locations, home and office). Also on each axis are each item that may be recommended, here being email, word processor, and chess. In the body of the table are the probabilities corresponding to each context and item. For example, the probability that a user in the context of morning will wish to utilize a word processor program is 0.83 (1 being the highest and 0 being the lowest). This can be seen in cell 500.

It should be noted that the correlation table is an abstraction of how data may be stored. There is no requirement that the correlation table be stored as a traditional table data structure. For example, the correlation table may be stored as an array.

At 404, once this table is populated, it becomes easy to determine the probability that an item will be useful to a user given a particular context. This is true no matter the number of dimensions in the context. For example, FIG. 5 is a sample table using a two-dimensional context (the context including a first dimension begin time of day and a second dimension being location). Computation of the probability based on both these dimensions may then be determined by using the formula:

$$P_{A_1} = \frac{\text{Corr}(C_1, A_1) + \ldots + \text{Corr}(C_n, A_1)}{d}$$

wherein P is probability, $C_i$ is the ith part of the current context (with $C_n$ being the last such part), $A_i$ is the ith software application to recommend, and d is the number of context dimensions.

Thus, for example, if the user's current context is morning and at work, and the system is determining the probability that the user will wish to use a word processing application, then the correlation table will be accessed for the combination of morning and word processing program (here, 0.83) as well as for the combination of work and word processing program (here, 0.95). These numbers are added and divided by 2 (the number of dimensions in the context), resulting in a probability of 0.89 that the user in the morning at work will wish to access a word processing program. Similar calculations may be performed for other items the user may wish to utilize or receive recommendations on.

In one embodiment of the present invention, the values to be stored in the correlation table are constructed using Pearson's correlation. Pearson's correlation reflects the degree of linear relationship between two variables. It ranges from +1 to −1. A correlation of +1 means that there is a perfect positive linear relationship between variables.

In another embodiment, the values to be stored in the correlation table are constructed using cosine-based correlation. In cosine-based correlation, the correlation coefficient can also be viewed as the cosine of the angle between the two vectors of samples.

At step 406, one or more of the items may be recommended based on the probability the user wishes to use them. The number of items to recommend may be determined in a number of different ways. In one embodiment, the system recommends x items having the highest probability that the user wishes to use them, wherein x is dynamically determined by using the average number of items that have been used in the selected clusters. In another embodiment of the present invention, x is simply a preset value selected by an administrator.

In another embodiment of the present invention, when it comes time to make a recommendation of an item, the values for the application usages in the correlation table are recomputed in order to get an estimate of the real value of each item using a formula that results in different values than simply the 0 to 1 range in the original correlation table. Specifically, the values may be recomputed using the following formula:

$$R(i) = \frac{\sum_j coef(i,j) \times (v_j - u_j)}{\sum_j |coed(i,j)|}$$

where R(i) denotes the real value of the usage of the application i under one of the past contexts and running applications, coef(i,j) denotes the correlation between the application i and a context or a running application j, and $v_j$ denotes the value of the context of a running application j, and $u_j$ denotes the mean value of the context of the running application j.

The real value of non-running applications then range from 1 to −1, with 1 representing a complete positive correlation and −1 representing a complete negative correlation. For each non-running application, the system may then compute a threshold as follows:

$$\text{threshold}_i = \frac{\sum R_i}{N} = 0.25 \times \sigma$$

where $R_i$ denotes the estimated real value for the application i in one instance in the log, and σ denotes the standard deviation of the R for this application in all conditions in the log. This threshold is then used to determine whether or not to recommend the application. If, for example, the correlation value for a non-running application is smaller than the threshold, then the application may not be recommended.

It should be noted that the computing and recommending steps would typically be performed only for items that are not currently being used by the user—the thought being that a user does not typically need a recommendation on an item to use if the user is already using it. However, there may be circumstances where it is beneficial to recommend an application to a user that is already being used. As such, nothing in this application shall be construed as limiting the recommendations to non-running items or items otherwise not being used, unless language is presented explicitly stating so.

It should also be noted that, in order to increase computing efficiency, it may be desirable to perform some of the steps of the method of FIGS. 4-5 during a device's idle time (offline). More specifically, in instances where the user's device is not being used or is lightly used, it becomes beneficial to perform some of the operations described above to maximize the availability of a processor of the user's device and to reduce the response time when the actual recommendation is requested (online).

Many of the steps involved in the gathering and clustering of the data itself can be performed while offline.

In another embodiment of the present invention, the probability-based solution described above may be combined with other techniques to improve the recommendation process. For example, a solution based on user-selected preferences was previously described in this document. While such a solution is very limited when utilized alone, if such a preference-based solution were combined with the probability-based solution described above, it may act to improve upon either solution operated alone. Such a solution might involve, for example, weighting the probabilities determined for a given context based upon the user preferences. For example, in a previously presented example, the probability that the user might wish to run a word processing application while at work and in the morning was listed at 0.89. However, perhaps this particular user prefers to play game applications while at work in the morning, because the user's boss does not come into work until the afternoon. If the user indicated that fact by providing a preference for game applications, the probability that the user might wish to run a word processing application may be reduced (or the probability that the user might wish to run a game application may be increased) by a weighting. In another embodiment of the present invention, the preferences may even be granularized to the same level as the tracked contexts, such that the user could expressly indicate a fondness for game applications while at work and during the mornings.

In an alternative combination of the probability-based solution and preference-based solution, the system may be designed to simply use the preference-based solution or a combination of the preference and probability-based solutions when preferences are indicated by a user, but to simply use the probability-based solution where no preferences are indicated. This allows preference-based information to still be utilized even when a large number of the users elect not to specify preferences, or where a user wishes to provide preferences for certain contexts but not others.

Figure 6:
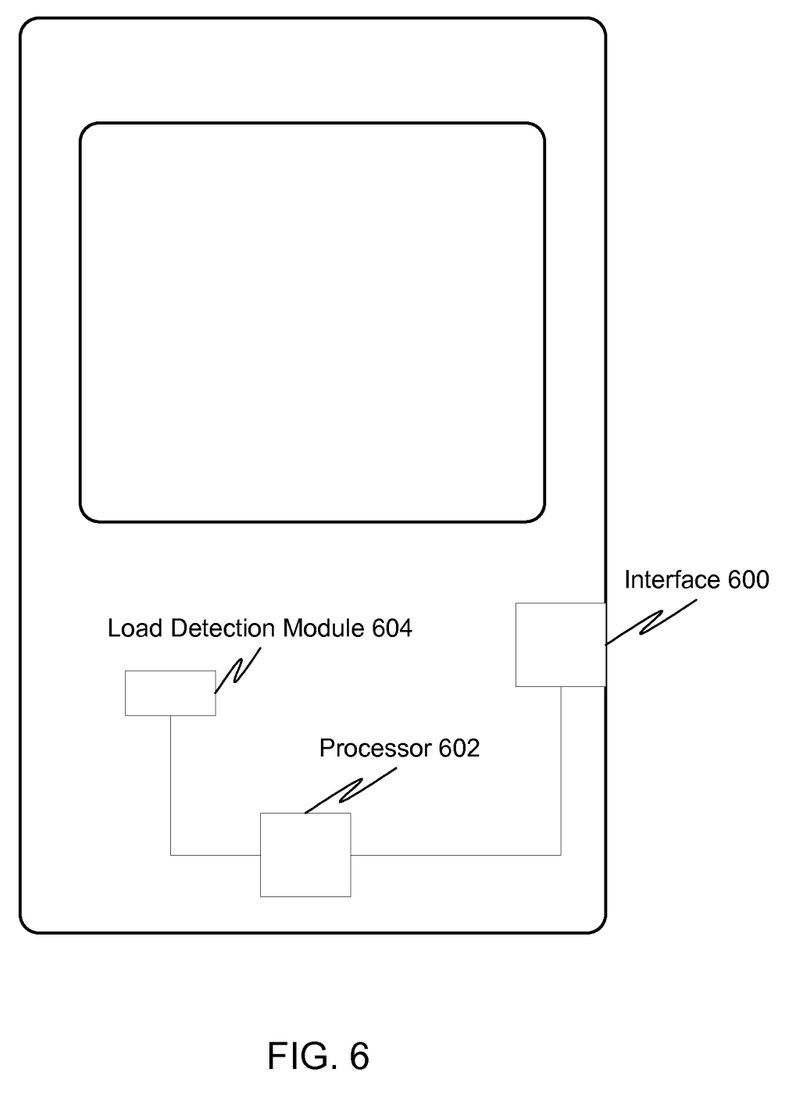
FIG. 6 is a block diagram illustrating a system in accordance with an embodiment of the present invention.

FIG. 6 is a block diagram illustrating a system in accordance with an embodiment of the present invention. In this diagram the system is a mobile device. One of ordinary skill in the art will recognize, however, that the system may be embodied in many different devices or in groups of devices. For example, the system may comprise a mobile device having a processor that performs some of the recited steps and also comprise a server that performs other of the recited steps. In another example, the system may comprise a desktop computer.

The system may include an interface 600 and one or more processors 602. The processors may be configured to perform some or all of the steps recited in FIG. 4 and the corresponding text above. Additionally, when the system includes a mobile device, it may include a load detection module 604. The load detection module may detect the load level of processor 602 (i.e., how busy the processor is). In such a case, the one or more processors may then be configured to perform the storing, and clustering, and determining when the device is not being used or is lightly used and to perform the selecting, computing, and recommending when the actual recommendation is requested by a user.

Figure 7:
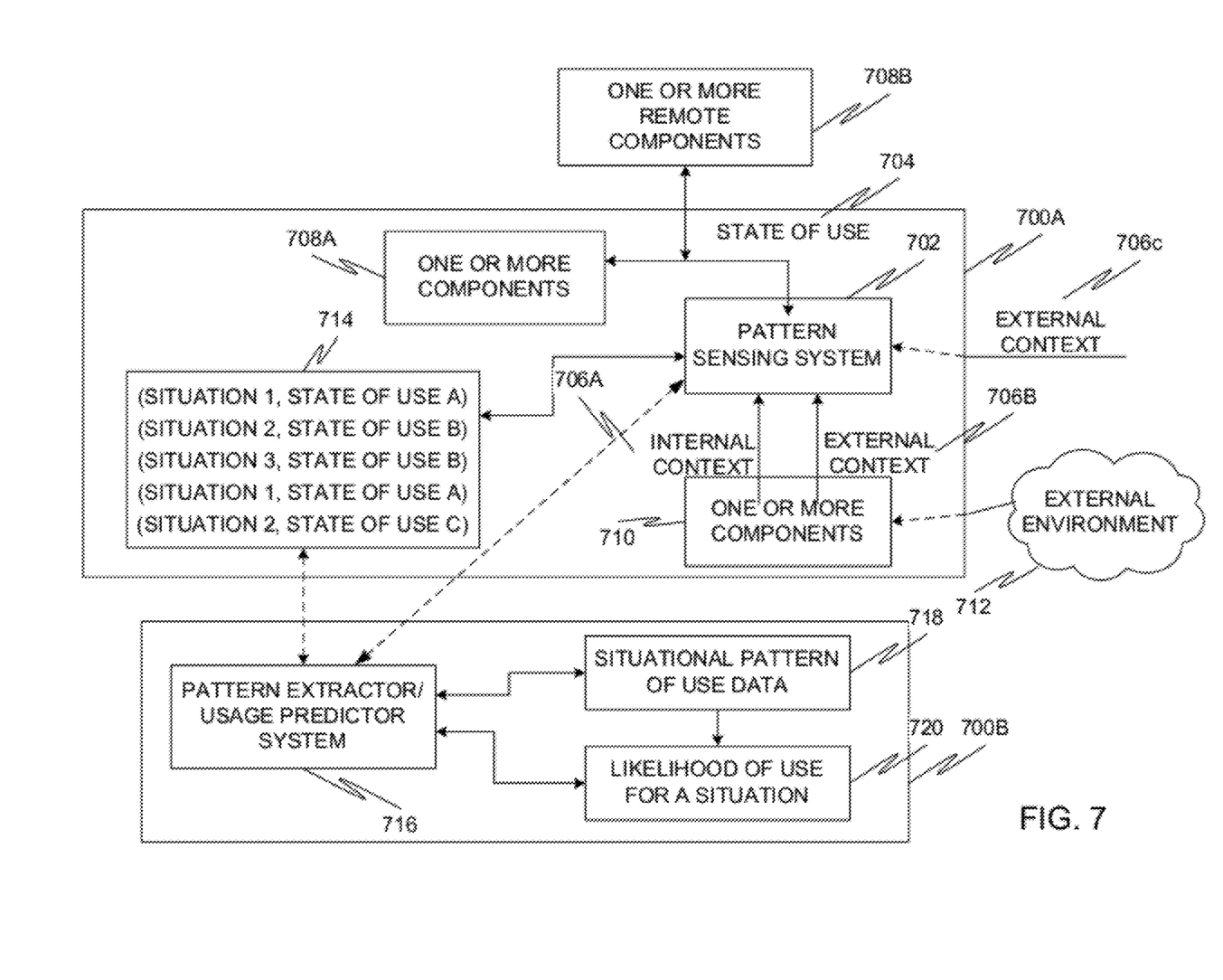
FIG. 7 depicts computing systems 700A and 700B in accordance with various embodiments of the invention.

FIG. 7 depicts computing systems 700A and 700B in accordance with various embodiments of the invention. Those skilled in the art will appreciate that the computing systems 700A and/or 700B can, for example, be a computing device that includes one or more processors and memory (not shown). The computing system 700A effectively includes a pattern sensing system 702 adapted for and/or capable of obtaining a state (or status) of user 704 and/or contextual information (context) 706.

In one embodiment, computing system 700A may be a mobile device and computing system 700B may be a server. However, this is merely one example of what form these computing devices may take, and is not intended to be limiting.

Typically, the state of use 704 is associated with and can be determined based on the state (or status) of one or more components 708 of the computing system 700A. The components 708 can include internal (708A) and remote (708B) components. The one or more components 708 can, for example, be one or more operational and/or executable components and/or usable components (e.g., one or more application programs being executed on the computing system 700A).

Similarly, the context 706 obtained by the pattern sensing system 702 can be associated and/or determined by or based on one or more components 710. As such, the component(s) 708 can be the same as the component(s) 710 or one or more different components. Generally, the pattern sensing system 702 obtains a context (e.g., a context of use) for the computing system 700A which can represent a situation for the computing system 700A. The context can be determined based on various internal and external factors including the state of use of one or components 708A. By way of example, the one or more components 710 can determine (e.g., measure) one or more factors, elements or variables associated with an external environment 712 and provide them to the pattern sensing system 702. As another example, internal context 706a representing the context of use of the computing system 700A may also be determined by and/or based on one or more components 708 A and/or 710 and provided to the pattern sensing system 702. It should be noted that external context 706c can also be received, for example, directly from one or more other external components (not shown) and processed by the pattern sensing system 702. As such, the context of use of one or more components 708 and/or 710 and other context information 706 can both be considered by the pattern sensing system 702 in determining a situation.

In any case, the pattern sensing system 702 processes the state of use information 704 and contextual information 706 in order to generate integrated state and contextual usage data 714. It will be appreciated that the pattern sensing system 702 can effectively represent the contextual information 706 as the situation associated with the state of use 704. As such, the integrated state and contextual usage data 714 can effectively include a set of situations (e.g., situation 1, situation 2, and situation 3) with their respective (or associated) state of use (e.g., state of use A, state of use B, state of use C). By way of example, the integrated state and contextual usage data 714 can effectively indicate that in a first situation, (situation 1), the computing system 700A has been in a first state of use (state of use A), and so on. As a result, the integrated state and contextual usage data 714 allows determining a pattern of use for the computing system 700A based on the association of a state of use with a particular situation in which the state of use has been effectively observed.

More particularly, the pattern extractor/usage predictor system 716 can effectively obtain the integrated state and contextual usage data 714 in order to determine the situational pattern of use data 718 based on the association of the state of use and the situation in which the use has been observed. It will be appreciated that the pattern extractor/usage predictor system 716 can use the situational pattern of use data 718 for many applications. By way of example, the situational pattern of use data 718 can be used to determine the likelihood of use 720 of the computing system 700A for a particular situation. As such, the likelihood of use 720 can, for example, effectively indicate the probability of the computing system 700A being used in a particular situation (e.g., situation 2) in accordance with a particular state of use (e.g., state of use C).

Those skilled in the art will readily appreciate that the pattern sensing system 702 and pattern extractor/usage predictor system 716 can be combined and provided for a single computing system (e.g., a computing device). In other words, a single computing system can effectively determine the integrated state and contextual usage data 714 and use it to extract the situational pattern of use data 718 for a variety of applications including determining the likelihood of use 720. It should also be noted that the pattern sensing system 702 can be in communication with the pattern extractor/usage predictor system 716. As such, the pattern sensing system 702 can effectively communicate the integrated state and contextual usage data 714. In addition, the pattern extractor/usage predictor system 716 can effectively provide feedback to the pattern sensing system 702, for example, based on the situational pattern of use data 718 and/or the likelihood of use 720, in order to, for example, affect the information gathered by the pattern sensing system 702 including the state of use 704 and contextual information 706.

The pattern extractor/usage predictor system 716 can, for example, determine a pattern of use based on the frequency of occurrence of one or more states of use with respect to one or more situations. It will be appreciated that there is no need to provide the computing system 700A or 700B with supervised training in order to determine a pattern of use (e.g., pattern of use of the computing system 700A). Further, it will be appreciated that the situations effectively represented by the integrated state and contextual usage data 714 need not be predefined prior to their occurrence. In other words, situations can be defined as they occur. As such, the pattern of use data 718 can, for example, be used in a dynamic manner to define and/or affect the information being obtained. Similarly, states of use need not be predefined prior to their occurrence. As a result, the computing systems 700A and 700B can readily adapt to new uses (e.g., new applications) and situations, as well as a change in usage (e.g., a change with respect to applications that are frequently used, use of a device by a different user or a user with different habits) and/or change in situations associated with the use of the computing system (e.g., using a device that has been used in an office at home, moving to a different geographical location).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for making recommendations, the method comprising:
 storing data relating to user usage patterns, wherein the data comprises information of items used and context in which the items were used, wherein context comprises a situation in which a device operated using the items;
 constructing a correlation table, wherein each axis of the correlation table comprises items for recommendation and related context, wherein the items and related context are both extracted from the usage patterns; and
 storing a correlation value between each item and each context in the correlation table, wherein the correlation values are used for making recommendations of one or more of the items.

2. The method of claim 1, wherein the correlation values comprise relationships between items and contexts.

3. The method of claim 1, wherein the items comprise software applications, computing services, or data.

4. The method of claim 1, wherein the correlation table contains each of the one or more items and each of the contexts described by data points on each axis of the correlation table.

5. The method of claim 1, wherein the correlation table is constructed using Pearson's correlation.

6. The method of claim 1, wherein the correlation table is constructed using cosine-based correlation.

7. The method of claim 1, further comprising recomputing one or more of the correlation values to capture real values in a usage log.

8. A method for making recommendations, the method comprising:
 storing data relating to user usage patterns, wherein the data comprises information as to items used and context in which the items were used, wherein context comprises a situation in which a device operated using the items;
 constructing a correlation table, wherein the constructing is performed without performing clustering of usage patterns; and
 storing a correlation value between each item and each context in the correlation table, wherein the correlations are used for making recommendations of one or more of the items.

9. The method of claim 8, wherein the correlation values comprise relationships between items and contexts.

10. The method of claim 8, wherein the items comprise software applications, computing services, or data.

11. The method of claim 8, wherein the correlation table contains each of the one or more items and each of the contexts described by data points on each axis of the correlation table.

12. The method of claim 8, wherein the constructing comprises using Pearson's correlation.

13. The method of claim 8, wherein the constructing comprises using cosine-based correlation.

14. The method of claim 8, further comprising recomputing one or more of the correlation values to capture real values in a usage log.

15. An apparatus comprising:
 an interface; and
 one or more processors configured to:
  store data relating to user usage patterns, wherein the data comprises information as to items used and context in which the items were used, wherein context comprises a situation in which a device operated using the items;
  construct a correlation table, wherein each axis of the correlation table comprises items for recommendation and related context, wherein the items and related context are both extracted from the usage patterns; and
  store a value correlation between each item and each context in the correlation table, wherein the correlations are used for recommending one or more of the items.

16. The apparatus of claim 15, wherein the apparatus comprises a mobile device.

17. An apparatus comprising:
 an interface; and
 one or more processors configured to:
  store data relating to user usage patterns, wherein the data comprises information as to items used and context in which the items were used, wherein context comprises a situation in which a device operated using the items;
  construct a correlation table without performing clustering of the usage patterns; and
  store a value correlation between each item and each context in the correlation table, wherein correlations are used for recommending one or more of the items.

18. The apparatus of claim 17, wherein the apparatus comprises a mobile device.

19. A system for making recommendations, the system comprising:
 means for storing data relating to user usage patterns, wherein the data comprises information as to items used and context in which the items were used, wherein context comprises a situation in which a device operated using the items;

means for constructing a correlation table, wherein each axis of the correlation table comprises items for recommendation and related context, wherein the items and related context are both extracted from the usage patterns;

means for storing a correlation value between each item and each context in the correlation table, wherein correlations are used for making recommendations of one or more of the items; and a computer processor configured to interact with the means for storing, means for constructing and means for storing and to perform calculations based on input therefrom, providing results.

20. A system for making recommendations without performing clustering of usage patterns, the system comprising:

means for storing data relating to user usage patterns, wherein the data comprises information as to items used and context in which the items were used, wherein context comprises a situation in which device operated using the items;

means for constructing a correlation table;

means for storing a correlation value between each item and each context in the correlation table, wherein correlations are used for recommending one or more of the items; and a computer processor configured to interact with the means for storing, means for constructing and means for storing and to perform calculations based on input therefrom, providing results.

21. A non-transitory program storage device readable by a machine tangibly embodying a program of instructions executable by the machine to perform a method for making recommendations, the method comprising:

storing data relating to user usage patterns, wherein the data comprises information as to items used and context in which the items were used, wherein context comprises a situation in which a device operated using the items;

constructing a correlation table, wherein each axis of the correlation table comprises items for recommendation and related context, wherein the items and related context are both extracted from the usage patterns; and storing a correlation value between each item and each context in the correlation table, wherein correlations are used for making recommendations of one or more of the items.

22. A non-transitory program storage device readable by a machine tangibly embodying a program of instructions executable by the machine to perform a method for making recommendations, the method comprising:

storing data relating to user usage patterns, wherein the data comprises information as to items used and context in which the items were used, wherein context comprises a situation in which a device operated using the items;

constructing a correlation table, wherein the constructing is performed without performing clustering of usage patterns; and storing a correlation value between each item and each context in the correlation table, wherein correlations are used for making recommendations of one or more of the items.

* * * * *